Oct. 6, 1959   J. M. BROWN ET AL   2,907,104
METHOD OF SOLDERING ALUMINUM
Filed April 1, 1955

JACK M. BROWN,
EDWIN D. NEWTON,
INVENTORS.

BY

ATTORNEYS.

United States Patent Office 2,907,104
Patented Oct. 6, 1959

2,907,104

METHOD OF SOLDERING ALUMINUM

Jack M. Brown, Monrovia, and Edwin D. Newton, West Covina, Calif.

Application April 1, 1955, Serial No. 498,556

3 Claims. (Cl. 29—488)

This invention relates to a method of soldering aluminum.

Heretofore aluminum and its alloys have been difficult to solder, and the reason is believed to be that the oxide coating which builds up on the surface of the metal upon exposure to air has prevented the solder from "wetting" the material. Consequently, conventional soldering techniques have not been successful for joining aluminum parts to other parts of aluminum or other metals.

In accordance with our invention, we first employ a suitable chemical composition which has a selective action in stripping off the oxide coating without seriously attacking the parent metal underneath. We then coat the bare oxide-free metal surface with an air-excluding material which is suitable as a soldering flux. The soldering step is then accomplished by conventional methods and the resulting joint is of excellent quality.

Figure 1:
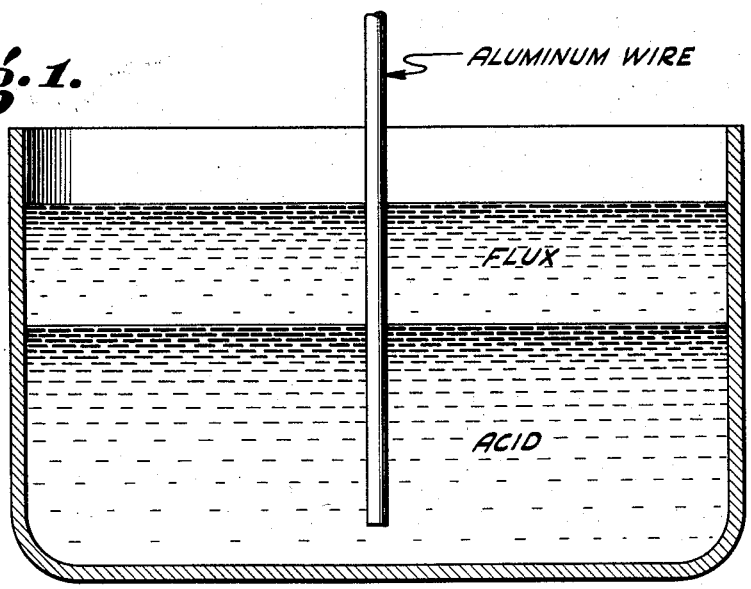
Figure 2:
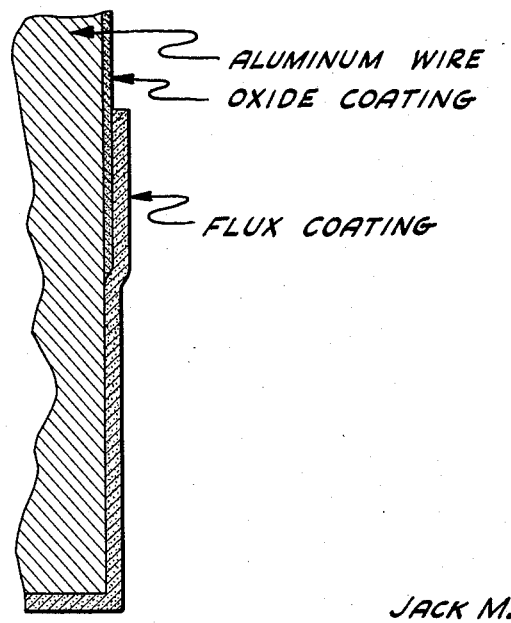

Reference to the accompanying drawing will aid in understanding an illustrative example of our improved method. In the drawing, Figure 1 shows an aluminum wire being dipped into a vessel containing an acid in the lower portion and a flux in the upper portion. Figure 2 is a sectional view on an enlarged scale, partly broken away, and showing the lower portion of the aluminum wire after being withdrawn from the vessel.

In this example, a 0.003 inch diameter wire of commercially pure aluminum is to be soldered at one end to a tinned brass lug, not shown. Hydrofluosilicic acid is placed in the lower part of the vessel. This acid is marketed by the Lee Chemical Company of Los Angeles, California, under the trade name "AE 32L." The upper portion of the vessel is filled with "Lonco Flux," an activated rosin suspended in an alcohol solution, and sold by the London Chemical Company of Chicago, Illinois. The flux solution and the acid do not mix, but remain in separate well-defined layers, the flux floating on the acid. One end of the aluminum wire is then immersed in the vessel contents, as shown in Figure 1, for sufficient time to enable the acid to strip the oxide from the wire surface. About three minutes may be required, depending upon the concentration of the acid. The wire is then withdrawn upward through the flux solution, and some of the flux solution adheres to the stripped bare wire and effectively excludes air from contact therewith.

The flux-coated end of the wire may then readily be attached to a tinned brass lug or other metallic terminal by conventional soldering technique. Thus the parts are heated and joined by applying "soft solder" of conventional 60% tin, 40% lead, rosin core type, melting below 550° F. The bare aluminum wire is "wet" by the solder and a sound joint is achieved.

The foregoing illustration is given by way of example, and not by limitation. It is recognized that the improved method can be practiced in other ways. For example, a small area of a larger aluminum part may be treated with an acid to remove the oxide film, and then coated with flux to exclude contact by air. The oxide-free flux-coated area may then be joined by soldering to another metallic part. Two aluminum parts may be soldered together by first removing the oxide with acid in the joinder areas on both parts, and then coating them with air-excluding flux. Final joinder is accomplished by conventional soldering methods, as described.

Having fully described our invention, it is to be understood that we do not wish to be limited to the details herein set forth, but our invention is of the full scope of the appended claims.

We claim:

1. The method comprising: dipping an aluminum part into a vessel containing a lower layer of hydrofluosilicic acid and an upper layer of activated rosin in an alcohol solution, holding the part in the acid for sufficient time to remove aluminum oxide film from the surface thereof, and withdrawing the aluminum part upward through the flux solution to coat the oxide-free surface with rosin and thereby exclude air from contact therewith.

2. The method comprising: dipping an aluminum part into a vessel containing a lower layer of hydrofluosilicic acid and an upper layer of activated rosin in an alcohol solution, holding the part in the acid for sufficient time to remove aluminum oxide film from the surface thereof, and withdrawing the aluminum part upward through the flux solution to coat the oxide-free surface with rosin and thereby exclude air from contact therewith, and then using molten solder to secure the rosin-coated portion to a metallic member.

3. In a method of soldering aluminum whereby an aluminum wire is treated so that it may be secured to a metallic member using molten solder, the steps comprising: dipping the aluminum wire into a vessel containing a lower layer of hydrofluosilicic acid and an upper layer of activated rosin in an alcohol solution, holding the wire in the acid for sufficient time to remove aluminum oxide film from the surface thereof, and withdrawing the aluminum wire upward through the flux solution to coat the oxide-free surface with rosin and thereby exclude air from contact therewith.

References Cited in the file of this patent

UNITED STATES PATENTS

| | | |
|---|---|---|
| 2,134,319 | Stone | Oct. 25, 1938 |
| 2,244,526 | McKay | June 3, 1941 |
| 2,315,725 | Moller | Apr. 6, 1943 |
| 2,321,071 | Ehrhardt | June 8, 1943 |
| 2,465,750 | Reid | Mar. 29, 1949 |
| 2,505,627 | Pessel | Apr. 25, 1950 |
| 2,698,811 | Legg | Jan. 4, 1955 |
| 2,756,497 | Gale | July 31, 1956 |